(No Model.)

C. H. LAWTON.
BUG TRAP.

No. 433,574.          Patented Aug. 5, 1890.

Witnesses:
W. C. Kimball
Stanton Tucker

Inventor:
C. H. Lawton

UNITED STATES PATENT OFFICE.

CHARLES H. LAWTON, OF NEW YORK, N. Y., ASSIGNOR OF TWO-THIRDS TO JOSEPH C. ROGERS, OF BROOKLYN, NEW YORK, AND CHARLES A. CAPEN, OF WILLIMANTIC, CONNECTICUT.

BUG-TRAP.

SPECIFICATION forming part of Letters Patent No. 433,574, dated August 5, 1890.

Application filed December 10, 1889. Serial No. 333,277. (No model.)

*To all whom it may concern:*

Be it known that I, CHARLES H. LAWTON, a resident of the city, county, and State of New York, have invented a new and Improved Bug-Trap, of which the following is a specification.

My invention consists of a trap useful for catching bugs of all kinds, but especially intended for the capture of cockroaches and red roaches or water-bugs, having a base and dome-shaped cover, with an inlet so arranged as to admit the bugs readily to the interior of the trap and yet effectually prevent escape of any bugs from its interior, while also permitting of convenient cleansing when desirable. The peculiarities of its construction are as hereinafter more fully explained, reference being had to the accompanying drawings, in which—

Figure 1:
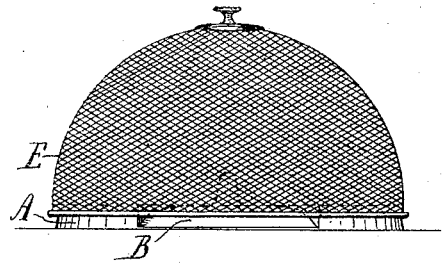
Figure 2:
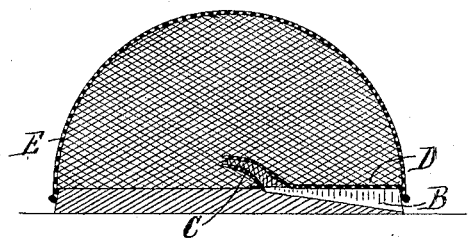
Figure 3:
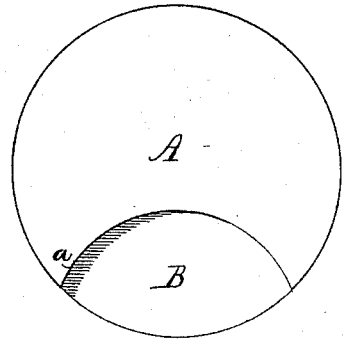
Figure 4:
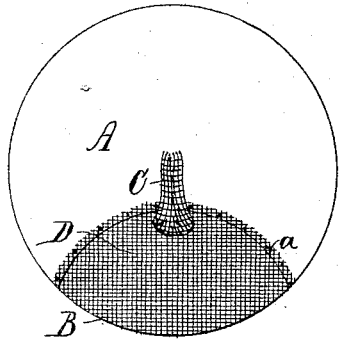

Figure 1 represents an elevation of the exterior of the trap, showing the entrance for bugs. Fig. 2 is a vertical section. Fig. 3 is a plan view of the base-block. Fig. 4 is a plan view of the base-block with gauze-covering shown over the depression in the base-block.

In the drawings A indicates the base, of any suitable material, preferably wood, and of any desired shape. It has a flat upper surface, and is also flat beneath.

At B is formed a depression or groove having an incline for its upper surface. Over this incline is secured to the base-plate (on floor-level) a woven-wire or wire-gauze covering to complete the level surface of the flooring of the trap.

At C is a tubular necking or conduit extending upward and inward vertically, inclined or curved, as desired, toward the interior of the trap. This necking is open to the covered way between incline B and gauze-covering D, and its other end is open to the interior of trap beneath the dome.

E indicates the dome-shaped cover of the trap, formed of woven wire or wire-gauze. Its lowermost edge or rim fits over the outer edge of the base-plate, which edge is formed with a slight flare to render the junction sufficiently tight as the cover is forced thereupon, and also to permit of ready removal of the cover when necessary for cleansing, &c.

I do not confine myself to the exact shape of the boundary-line of the depressed incline B, as shown at *a*, Figs. 3 and 4, as it may be curved, funnel-shaped, or otherwise, as preferred.

At the interior end of necking D the longitudinal wires are left projecting as points to prevent the bugs escaping.

Any bait may be spread over the floor of the trap to lure the bugs inward. I also coat the gauze necking or wrap around the same a cloth or paper wrapper coated with a compound sufficiently sticky to hold the bugs fast and prevent their getting to the outlet.

What I claim as new, and desire to secure by Letters Patent of the United States, is—

A bug-trap consisting of a base-block and hemispherical cover, the base-block formed with an inclined depression, as a runway, extending from side (or edge) of block toward its center, the said runway covered with a flat screen of wire-gauze having at the inner point (or centrally) of the base-block a tubular extension of the woven wire open to runway and also to interior of trap-chamber, the runway and tube forming the communication by which bugs can enter, as herein set forth.

C. H. LAWTON.

Witnesses:
W. C. KIMBALL,
STANTON TUCKER.